(12) United States Patent
Yeh

(10) Patent No.: US 8,408,732 B2
(45) Date of Patent: Apr. 2, 2013

(54) WIRELESSLY CONNECTABLE LIGHT SOURCE

(75) Inventor: Ming-Hsiang Yeh, Taipei (TW)

(73) Assignee: Winharbor Technology Co., Ltd., New Taipei (TW)

( * ) Notice: Subject to any disclaimer, the term of this patent is extended or adjusted under 35 U.S.C. 154(b) by 261 days.

(21) Appl. No.: 12/929,884

(22) Filed: Feb. 23, 2011

(65) Prior Publication Data
US 2011/0216531 A1 Sep. 8, 2011

(30) Foreign Application Priority Data

Mar. 5, 2010 (TW) ............................... 99203891 U

(51) Int. Cl.
*F21L 4/00* (2006.01)
(52) U.S. Cl. .................... 362/183; 362/103; 362/105
(58) Field of Classification Search .................. 362/183, 362/103, 105
See application file for complete search history.

(56) References Cited

U.S. PATENT DOCUMENTS

| | | | | |
|---|---|---|---|---|
| 7,311,415 | B1 * | 12/2007 | Burnidge | 362/154 |
| 2008/0080172 | A1 * | 4/2008 | Mayo et al. | 362/106 |
| 2012/0014095 | A2 * | 1/2012 | Waters | 362/106 |

* cited by examiner

*Primary Examiner* — Evan Dzierzynski
(74) *Attorney, Agent, or Firm* — Bacon & Thomas, PLLC

(57) ABSTRACT

The present invention provides a wirelessly connectable light source, which includes a woven member, an electrical conductor, a receiver circuit, and a light-emitting element. The woven member includes a body and an extension section extending from the body. The conductor is arranged in the body and the receiver circuit is electrically connected to the conductor. The light-emitting element is arranged inside the body and includes a light emission section and two conductive sections. The light emission section emits light projecting outside the body of the woven member. Light emitting from the light emission section is projected outside the body of the woven member. The two conductive sections are electrically connected to the conductor. Through integration of the extension section of the woven member to an article and coupling of a charging device to the article, the charging device may perform electrical charging to the receiver circuit so as to supply electrical power to the light-emitting element for giving off light.

32 Claims, 8 Drawing Sheets

WIRELESSLY CONNECTABLE LIGHT SOURCE

FIELD OF THE INVENTION

The present invention relates to a wirelessly connectable light source, and in particular to a wirelessly connectable light source that is wirelessly chargeable and is mountable to an article of fabric product or leather product through weaving, welding, adhesive bonding, and sewing to give off light.

BACKGROUND OF THE INVENTION

Conventionally, to additionally mount a light-emitting element, such as a light-emitting diode (LED) to a personal item, such as garments, pants, shirts, underwear, or brand bags (or ordinary bags), leather bags, leather belts (waist belts), raincoats, hats, or jackets, the only known practice is to mount a light-emitting element to a jacket or a hat to improve nighttime atmosphere, amusing, or aesthetics effect.

Further, these articles are made by applying proper jointing techniques, such as sewing and stitching, bonding (such as ultrasonic bonding), and/or thermal fusion, to joint multiple pieces of fabrics, which can be of different materials, different colors, and different shapes. However, it was considered a difficult to mount a light-emitting element to these articles. A conventional solution is to cover and secure the light-emitting element with a transparent, waterproof sheet material. In such a way of securing light-emitting element, the light-emitting element is not actually integrated with the woven parts of these articles, leading to undesired constraints in both the use and the configuration thereof.

Further, electrical power that is used to operate the light-emitting element is often supplied from a rechargeable battery, such as nickel-hydride battery and lithium battery. This rechargeable battery is re-chargeable by a charging device, which is electrically connected in a wired fashion to for example an electrical socket so that the electrical power for charging the battery is supplied through a cable or wire to the rechargeable battery. This limits the spatial range of usage and reduces the convenience of use. Thus, it is desired to provide a light source that can be directly sewn to or woven in an article, such as garment, pants, shirt, underwear, or brand bag (or ordinary bag), leather bag, leather belt (waist belt), raincoat, hat, or jacket.

SUMMARY OF THE INVENTION

An objective of the present invention is to provide a wirelessly connectable light source, and in particular a wirelessly connectable light source that is wirelessly chargeable and can be directly sewn to, welded to, adhesively bonded to, or woven in a product.

To achieve the above objective, the present invention provides a wirelessly connectable light source, which is applicable to an article to which a charging device is coupled. The charging device comprises a transmitter circuit and a power source that is connected to the transmitter circuit so that the power source supplies electrical power to the transmitter circuit and the electrical power is converted by the transmitter circuit into an alternate-current (AC) signal. The wirelessly connectable light source comprises a woven member, a conductor, a receiver circuit, and at least one light-emitting element. The woven comprises a body and an extension section from the body. The conductor is housed in the body. The receiver circuit comprises a rechargeable battery and is electrically connected to the conductor. The AC signal is transmitted from the transmitter circuit to the receiver circuit and is received and converted by the receiver circuit into electrical power that is stored in the rechargeable battery. The light-emitting element is arranged inside the body and comprises a light emission section and at least two conductive sections, wherein the light emission section emits light projecting out of the body of the woven member and the two conductive sections are respectively in electrical connection with the conductor. The wirelessly connectable light source uses the extension section of the woven member to integrate with the article.

As such, the wirelessly connectable light source can be directly sewn, welded, adhesively bonded, woven with an article through the extension section so that the drawbacks of the conventional techniques can be completely overcome.

Another objective of the present invention is to provide a wirelessly connectable light source, which further comprises a control circuit and a switch, wherein the control circuit, the switch, and the rechargeable battery of the receiver circuit are electrically connected to the conductor to allow the rechargeable battery to supply electrical power to energize the light-emitting element for giving off light and the control circuit controls the lighting fashion of the light-emitting element.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
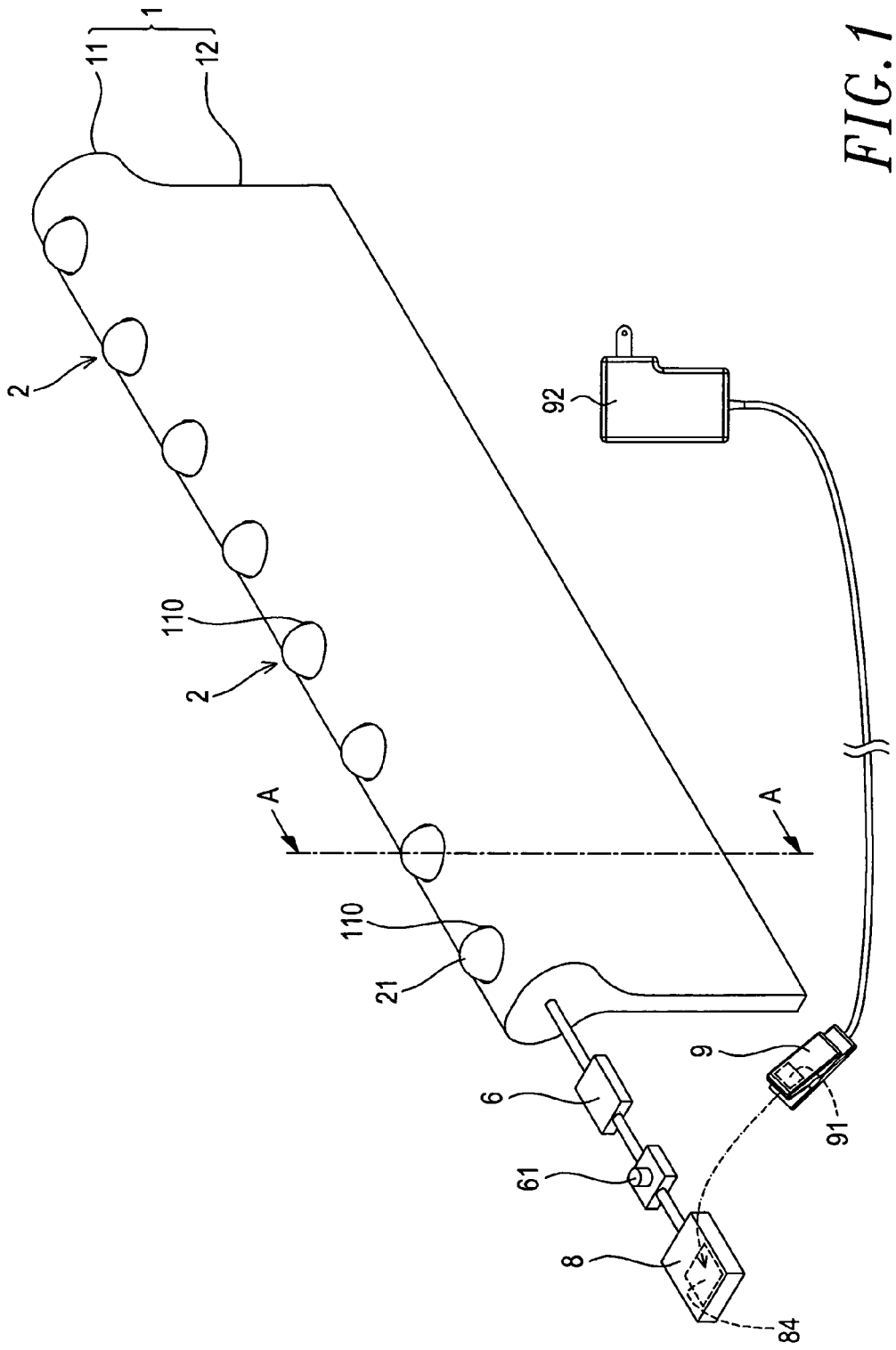
FIG. 1 is a perspective view showing a wirelessly connectable light source according to the present invention.

The present invention provides a wirelessly connectable light source. In the attached drawings, FIG. 1 illustrates a perspective view of the light source according to the present invention and FIGS. 2-8B respectively show first to sixth embodiments of the present invention. The light source of the present invention is applicable to an article, which is not shown in the drawings. A charging device 9 is coupled to the article (by means of for example clamping, bonding, adhering, or mutual attraction). The charging device 9 comprises a transmitter circuit 91 and a power source 92 connected to the transmitter circuit 91. The power source 92 supplies electrical power to the transmitter circuit 91 and the electrical power is converted by the transmitter circuit 91 into an alternate-current (AC) signal. The article can be for example garments, pants, shirts, underwear, or brand bags (or ordinary bags), leather bags, leather belts (waist belts), raincoats, hats, or jackets, but not limited thereto.

First Embodiment

Referring to FIGS. 1, 2, and 8A-8B, a first embodiment according to the present invention is shown, comprising a woven member 1, at least one light-emitting element 2, an electrical conductor 3, and a receiver circuit 8. In the embodiment shown in the drawings, a plurality of light-emitting elements 2 is included. The light-emitting elements 2 can be light-emitting diodes (LEDs) or organic light-emitting diodes (OLEDs).

The woven member 1, which can be made of for example fabric, cotton, or a knitted material, comprises a body 11 and at least one extension section 12 extending from the body 11. In the embodiment shown in the drawings, the woven member 1 comprises one extension section 12. The light-emitting elements 2 and the conductor 3 are arranged inside the body 11. Alternatively, the light-emitting elements 2 and the conductor 3 can be woven within the body 11 in weaving the woven member 1.

Each light-emitting element 2 comprises a light emission section 21 and at least two conductive sections 22. The two conductive sections 22 are respectively in electrical connection with the conductor 3. In the first embodiment shown in the drawings, the two conductive sections 22 are conductive pins and the conductor 3 comprises a flexible printed circuit board. As such, when electrical power is supplied to the conductor 3, all the light-emitting elements 2 can be energized for emission of light.

The receiver circuit 8 is electrically connected to the conductor 3 to allow the AC signal transmitted from the transmitter circuit 91 to be received by the receiver circuit 8. The receiver circuit 8 comprises a receiver induction coil 81, a secondary receiving resonant circuit 82 connected to the receiver induction coil 81, an AC/DC rectification and filtering regulation circuit 83 connected to the secondary receiving resonant circuit 82, and a rechargeable battery 84 connected to the AC/DC rectification and filtering regulation circuit 83. The rechargeable battery 84 can be a built-in rechargeable battery or an externally connected rechargeable battery for receiving an AC signal that is transmitted from the transmitter circuit 91 and received by the receiver induction coil 81. The AC signal is subjected to resonance by the secondary receiving resonant circuit 82 and is further subjected to rectification and regulation by the AC/DC rectification and filtering regulation circuit 83 so as to convert the AC signal into electrical power. The electrical power is then stored in the rechargeable battery 84 so that the rechargeable battery 84 may subsequently supply the electrical power to each of the light-emitting elements 2.

The transmitter circuit 91 and the power source 92 can be connected in a wired fashion or a wireless fashion. The transmitter circuit 91 comprises an oscillation and frequency-division circuit 911 that is connected to the power source 92, a driving and amplifying circuit 912 connected to the oscillation and frequency-division circuit 911, a primary transmitting resonant circuit 913 connected to the driving and amplifying circuit 912, and a transmitter coil 914 connected to the primary transmitting resonant circuit 913, whereby the oscillation and frequency-division circuit 911 converts the electrical power supplied from the power source 92 into an AC signal, which is then amplified by the driving and amplifying circuit 912, and the amplified AC signal is subjected to resonance by the primary transmitting resonant circuit 913 to be transmitted by the transmitter coil 914 to the receiver circuit 8. Further, the transmitter circuit 91 may further comprise a feedback detection circuit 915 connected to the transmitter coil 914 and a control regulation circuit 916 connected to the feedback detection circuit 915 and the oscillation and frequency-division circuit 911, whereby the feedback detection circuit 915 feeds the AC signal transmitted by the transmitter coil 914 back to the control regulation circuit 916 to allow the control regulation circuit 916 to regulate the oscillation frequency of the oscillation and frequency-division circuit 911 in order to acquire the optimum result of resonance. The woven member 1 of the first embodiment shown in the drawings may adopt two ways to project the light emitting from the light-emitting elements 2. One is the formation of multiple holes 110 in the body 11 as shown in the drawings, and light emitting from the light emission section 21 of each light-emitting element 2 is allowed to project outside the body 11 through the holes 110. The light emission sections 21 that are exposed outside the body 11 are covered by a waterproof layer 14 (such as a waterproof polymerized material) in order to improve water protection and sealing thereof. The other way is using a weaving fashion of variable density (not shown) to make the woven member 1, whereby the body 11 has a lower density of weaving to allow light emitting from the light emission sections 21 to project through large gaps present in the weaving of the body 11.

As such, mounting the wirelessly connectable light source to an article through sewing, welding, adhesively bonding, or weaving can be realized by simply attaching the extension section 12 of the woven member 1 to the article by sewing, welding, adhesively bonding, or weaving. This completely overcomes the drawbacks of the conventionally known techniques.

Further, through proper coupling between the charging device 9 and the receiver circuit 8 (the charging device 9 and the receiver circuit 8 being coupled together through clamping in the drawings), the power source 92 is allowed to supply electrical power to the transmitter circuit 91, which converts the electrical power into an AC signal that is then transmitted by the transmitter coil 914 of the transmitter circuit 91 to the receiver circuit 8, so that the receiver circuit 8 can be charged to allow the rechargeable battery 84 to supply electrical power to each of the light-emitting elements 2, thereby facilitating the convenience of use.

Further, the wirelessly connectable light source according to the present invention further comprises a control circuit 6 and a switch 61, whereby the control circuit 6 and the switch 61 are electrically connected to the conductor 3. The control circuit 6 and the switch 61 are arranged inside the woven member 1. The control circuit 6 controls the fashion of light emission of the light-emitting elements 2 (such as regular light emission, flashing, or lighting with various brightness). As such, the wirelessly connectable light source according to the present invention is capable of supplying electrical power through the rechargeable battery 84 for energizing the light-emitting elements 2 to give off light and using the switch 61 to selectively light on or off the light-emitting elements 2 and may be further capable of controlling, through the control circuit 6, the lighting fashion of the light-emitting elements 2.

Second Embodiment

Figure 2:
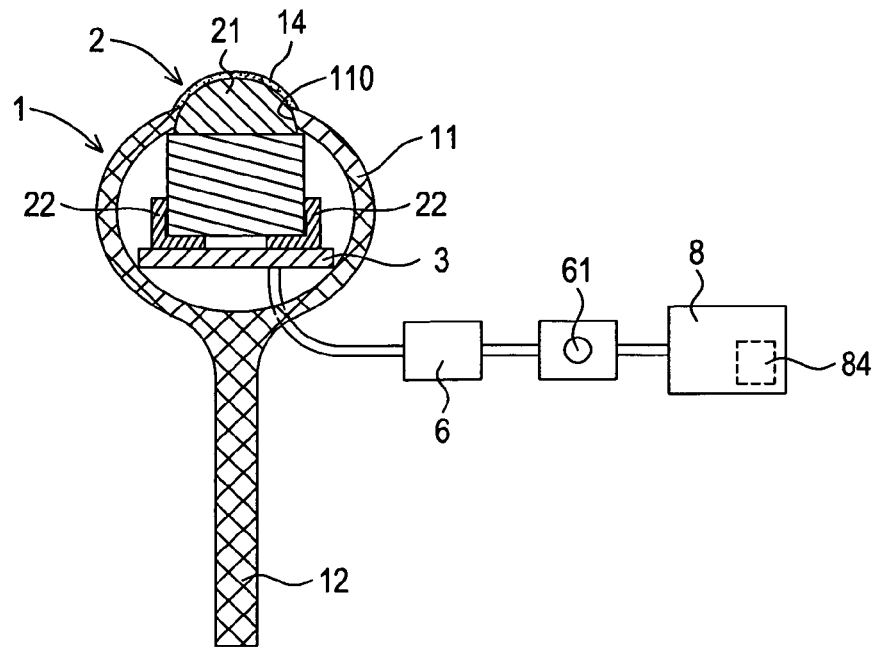
FIG. 2 is a cross-sectional view taken along line A-A of FIG. 1, showing a first embodiment of the present invention.
Figure 3:
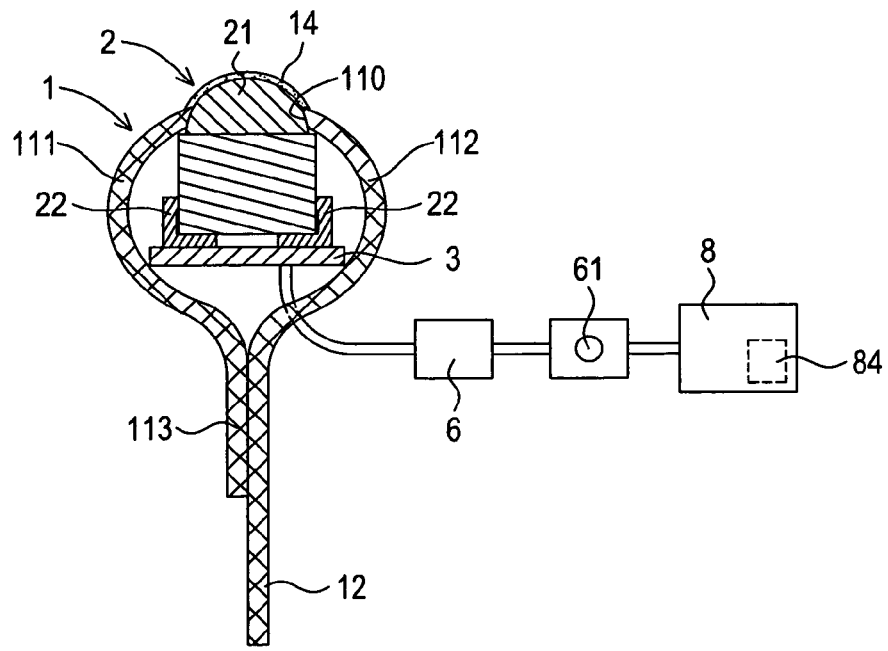
FIG. 3 is a cross-sectional view taken along line A-A of FIG. 1, showing a second embodiment of the present invention.

Referring to FIG. 2, a wirelessly connectable light source according to a second embodiment of the present invention is substantially identical to that of the first embodiment in structure, except the difference of woven member 1.

As shown in the drawing, the woven member 1 comprises a body (reference numeral 11 as shown in FIG. 1) that is comprised of two mutually-connected half portions 111, 112. An extension section 12 extends from one of the half portions 111, 112 (such as the half portion 112 shown in the drawing), while a coupling rim 113 is formed on the other one of the half portions 111, 112 (such as the half portion 111 shown in the drawing). The coupling rim 113 is coupled to the extension section 12 through for example sewing or bonding (such as ultrasonic bonding or thermal fusion).

Third Embodiment

Figure 4:
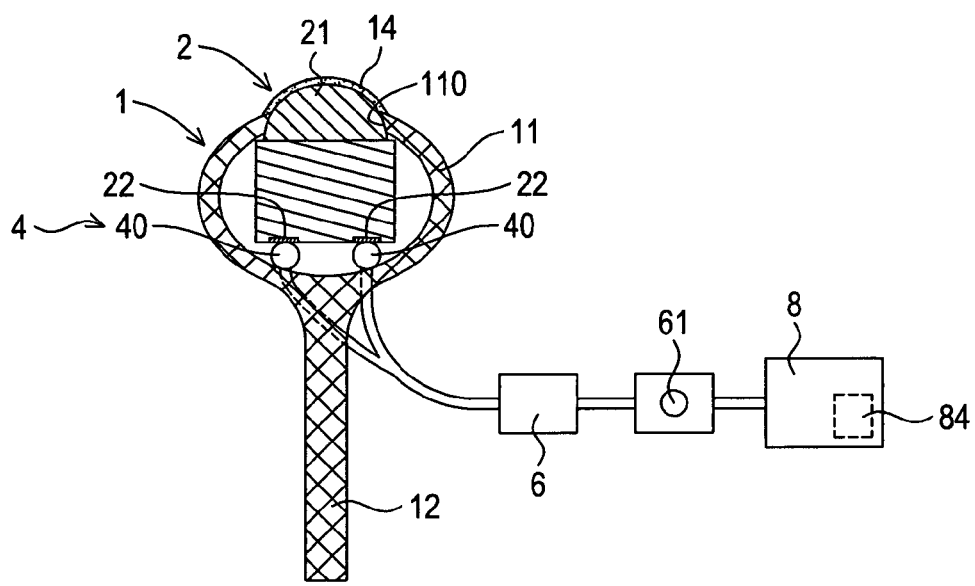
FIG. 4 is a cross-sectional view taken along line A-A of FIG. 1, showing a third embodiment of the present invention.

Referring to FIGS. 1 and 4, a wirelessly connectable light source according to a third embodiment of the present invention is substantially identical to that of the first embodiment in structure, except the differences of light-emitting elements 2 and conductor 4.

As shown in the drawings, the conductor 4 comprises at least two conductive wires 40 (such as two conductive wires for supplying of power and one conductive wire for control purposes, two power-supplying conductive wires being shown in the drawing). The two conductive sections 22 of each light-emitting element 2 are respectively in electrical connection with the two conductive wires 40. The control circuit 6 and the switch 61 are both electrically connected to the conductor 4.

Figure 4A:
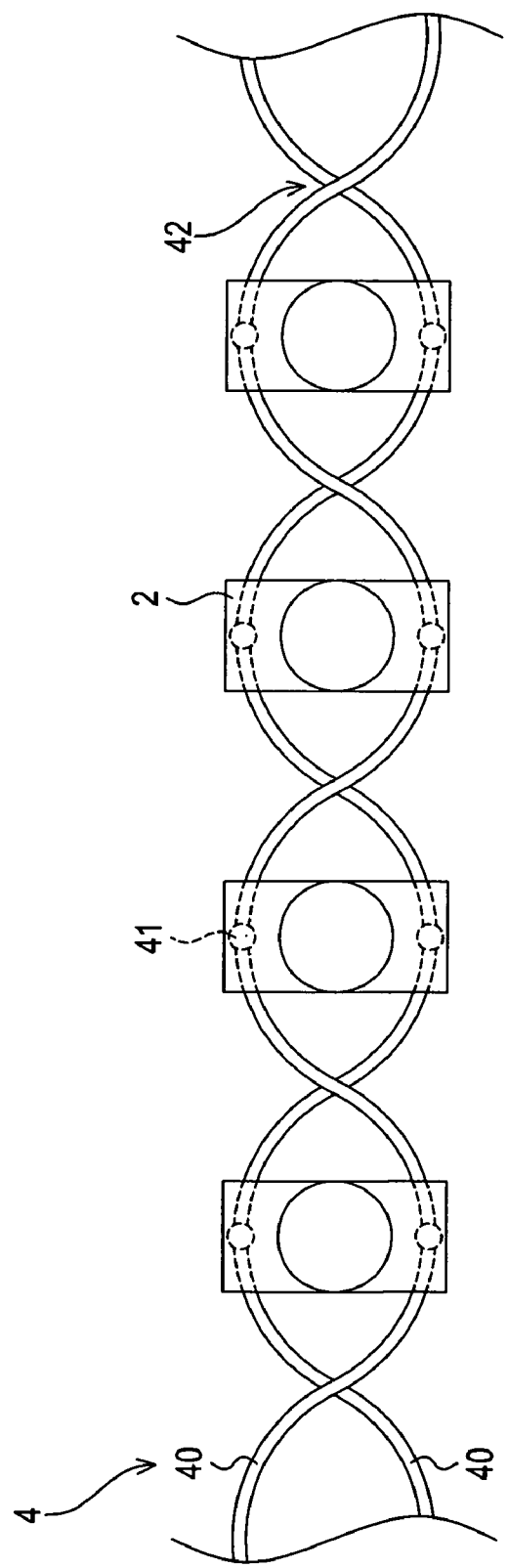
FIG. 4A is a schematic view showing spatial relationship between an electrical conductor and light-emitting elements of the third embodiment of the present invention shown in FIG. 3, a body of a woven member of the present invention being omitted.

The two conductive wires 40 can be woven with the body 11 of the woven member 1. As shown in FIG. 4A, the two conductive wires 40 are arranged to intersect each other at predetermined intervals and are woven with the body 11. (It is noted that the body 11 is omitted in FIG. 4A.) The intersections 42 between the two conductive wires 40 are spaced from each other by portions of the body 11, which are omitted in FIG. 4A, and the light-emitting elements 2 are electrically connected to the conductive wires 40 through soldering spots 41.

Fourth Embodiment

Figure 5:
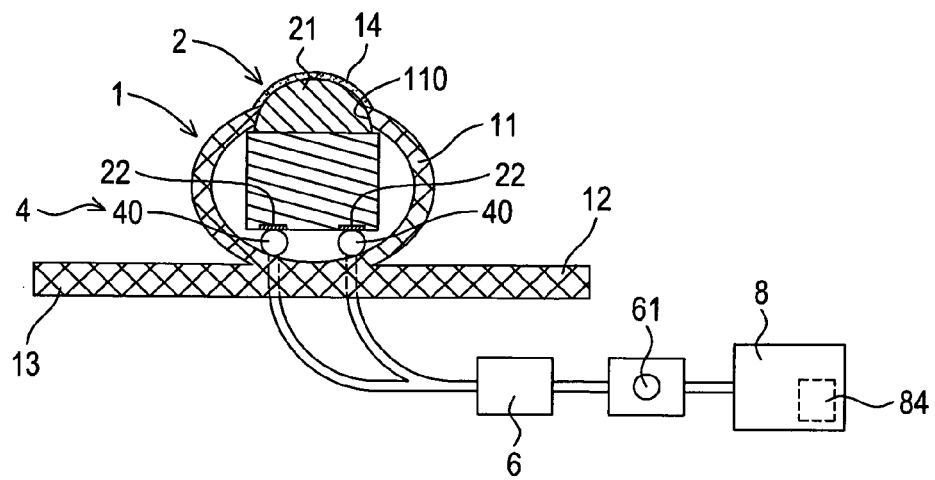
FIG. 5 is a cross-sectional view taken along line A-A of FIG. 1, showing a fourth embodiment of the present invention.

Referring to FIG. 5, a wirelessly connectable light source according to a fourth embodiment of the present invention is substantially identical to that of the third embodiment in structure, except the difference of woven member 1.

As shown in the drawing, the woven member 1 comprises two extension sections 12, 13, which both extend from the body 11. The wirelessly connectable light source of the present invention uses the two extension sections 12, 13 of the woven member 1 to mount to the article through sewing, welding, adhesively bonding, or weaving.

Fifth Embodiment

Figure 6:
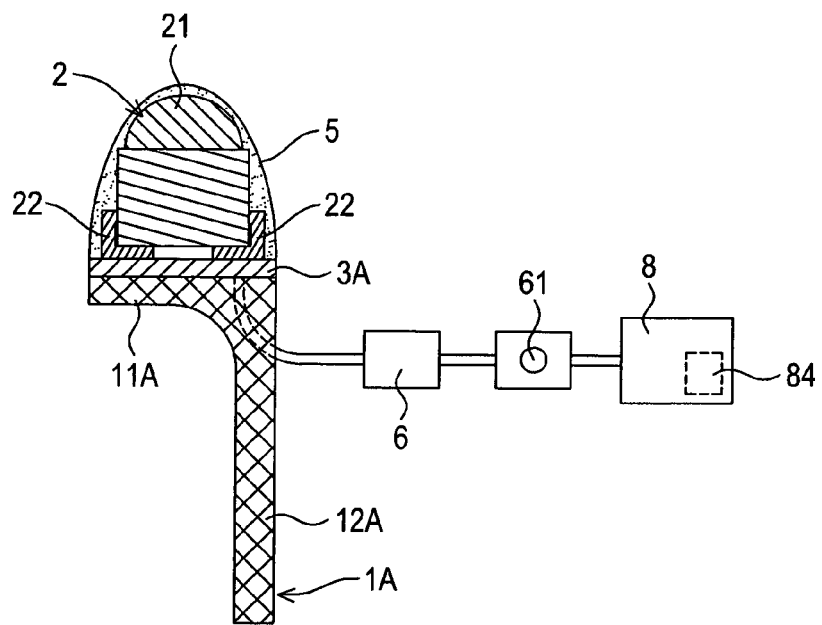
FIG. 6 is a cross-sectional view taken along line A-A of FIG. 1, showing a fifth embodiment of the present invention.

Referring to FIG. 6, a wirelessly connectable light source according to a fifth embodiment of the present invention is different from the first embodiment in structure, except that the light-emitting element 2 in both embodiment is identical.

As shown in the drawing, the wirelessly connectable light source according to the instant embodiment of the present invention comprises: a woven member 1A, at least one light-emitting element 2, a flexible printed circuit board 3A, and a cover 5.

The woven member 1A comprises a body 11A and an extension section 12A extending from the body 11A. The flexible printed circuit board 3A is adhesively bonded to the body 11A of the Woven member 1A. As shown in the drawing, in the embodiment illustrated, a plurality of light-emitting elements 2 is provided and each light-emitting element 2 comprises a light emission sections 21 and at least two conductive sections 22 (which can be two pins as shown in the drawing). The two conductive sections 22 are electrically connected to the flexible printed circuit board 3A. The light-emitting elements 2 are enclosed between the cover 5 and the flexible printed circuit board 3A for protection. The receiver circuit 8 is electrically connected to the flexible printed circuit board 3A. The transmitter circuit 91 (see FIG. 1) transmits, in a wireless manner, an AC signal to the receiver circuit 8 and the receiver circuit 8 receives and converts the AC signal into electrical power that is then stored in the rechargeable battery 84 of the receiver circuit 8.

Further, the wirelessly connectable light source according to the present invention may additionally comprise a control circuit 6 and a switch 61. The control circuit 6 and the switch 61 are both electrically connected to the flexible printed circuit board 3A. The control circuit 6 and the switch 61 are arranged inside the woven member 1.

The wirelessly connectable light source according to the present invention can use the extension section 12A of the woven member 1A to be sewn to or woven with the article and thus completely overcomes the drawbacks of the conventionally known techniques.

Sixth Embodiment

Figure 7:
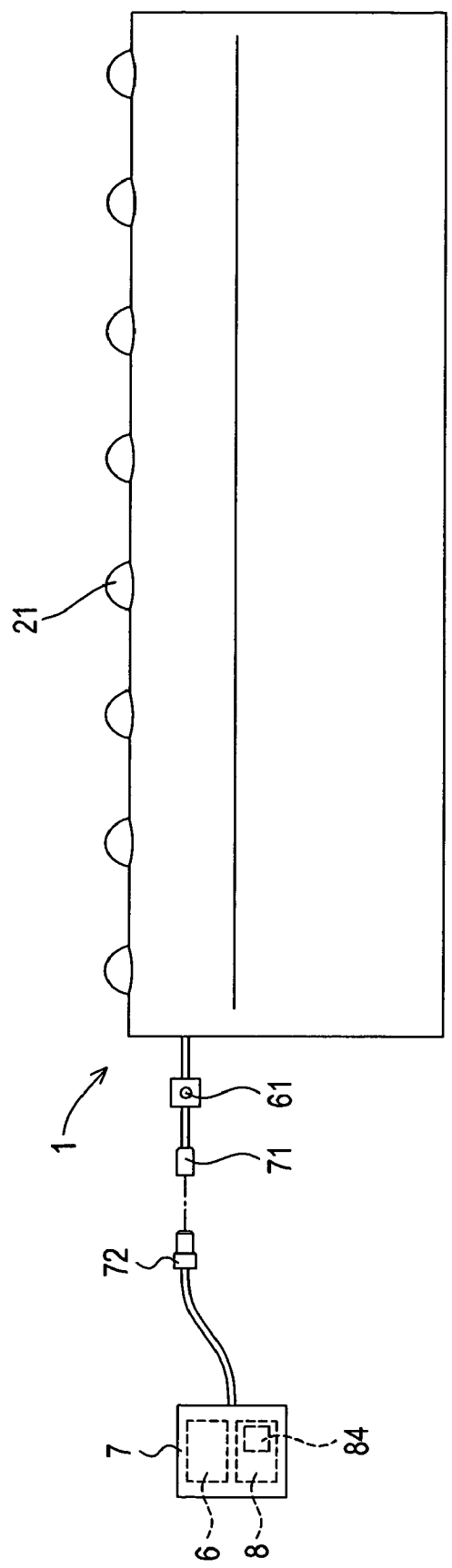
FIG. 7 is a schematic view showing connection with an external battery and a control circuit according to a sixth embodiment of the present invention.
Figure 8A:
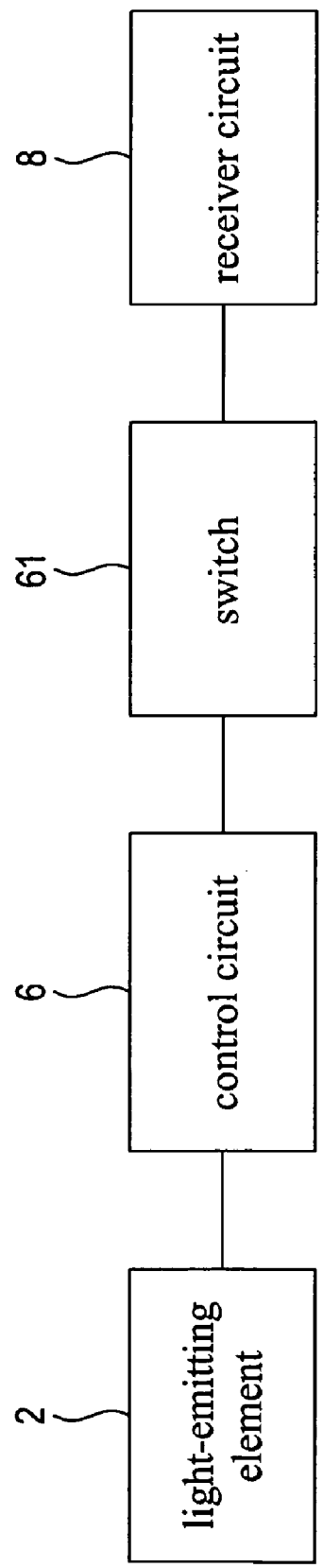
FIGS. 8A and 8B are circuit diagrams of the present invention.
Figure 8B:
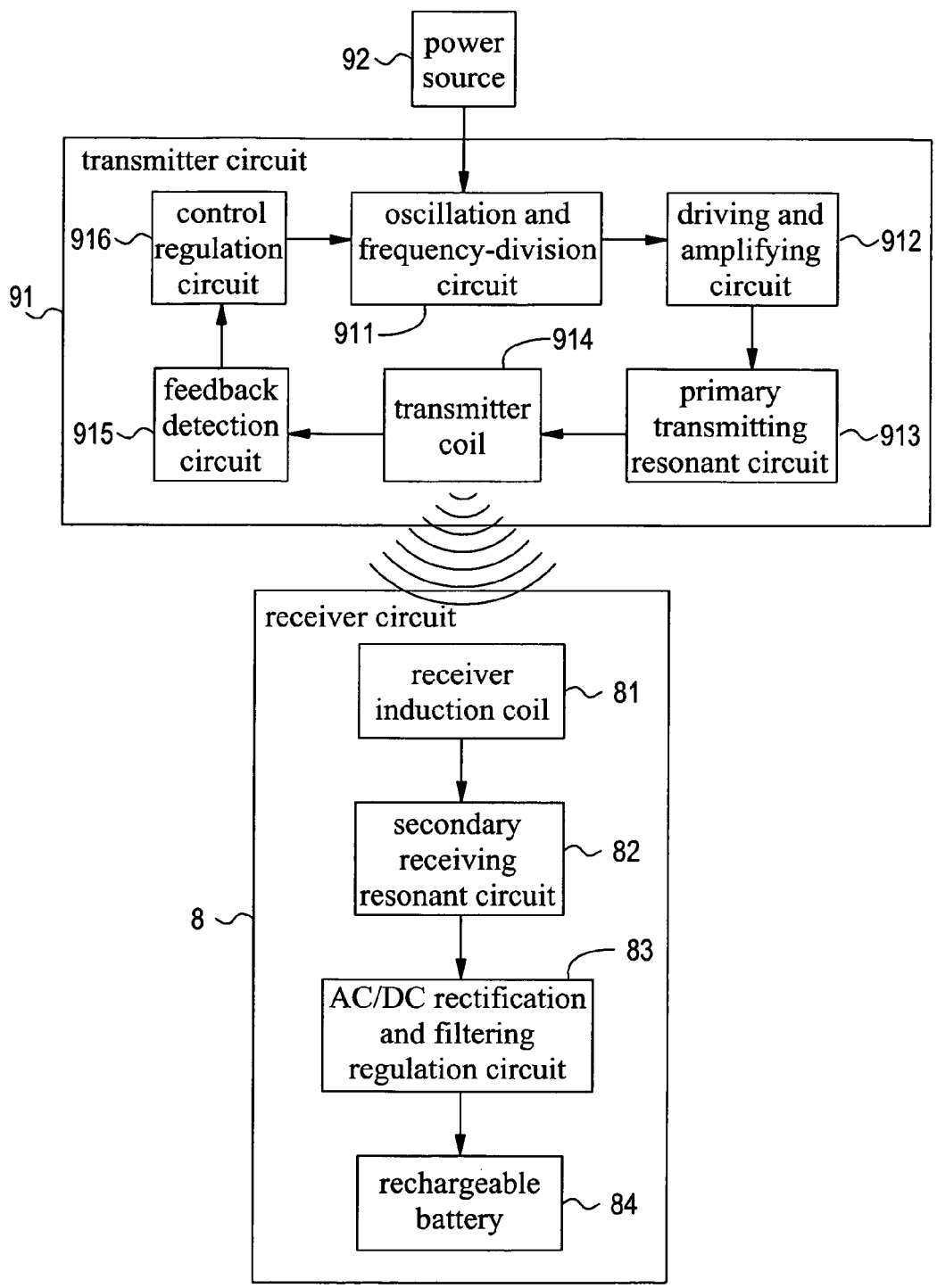

Referring to FIG. 7, a wirelessly connectable light source according to a sixth embodiment of the present invention is substantially identical to that of the first embodiment in structure, except the difference of control circuit 6 and receiver circuit 8. As shown in the drawing, external connection is adopted in the instant embodiment for establishing electrical connection with the control circuit 6 and the receiver circuit 8. In other words, the wirelessly connectable light source according to the present invention further comprises an external connecting member 7 and a connector 71. The connector 71 and the switch 61 are electrically connected to the conductor 3, 4 or the flexible printed circuit board 3A (see FIG. 6) through conductive wires, so that the connector 71 and the switch 61 can be located outside the woven member 1, 1A (see FIG. 6) through the extension of the conductive wires. This outside-located portion can be additionally mounted (through such as sewing) to a proper site of the article (such an inside surface of a garment). The external connecting member 7 comprises the receiver circuit 8 and a control circuit 6 for controlling the lighting fashion of the light-emitting element 2. The lighting fashion may include regular light emission, flashing, and lighting with various brightness. The external connecting member 7 further comprises a counterpart connector 72 corresponding to the connector 71, whereby the external connecting member 7 is electrically connected through the mating engagement between the counterpart connector 72 and the connector 71 to the conductor 3, 4 or the flexible printed circuit board 3A (see FIG. 6).

Besides control of lighting on/off through the switch 61, selective external connection of the external connecting member 7 may be used to select use or no use of the control circuit 6 and the receiver circuit 8.

The structural feature of the wirelessly connectable light source according to the present invention is as follows. The light-emitting elements 2 and the conductor 3, 4 are arranged inside or woven within the body 11 of the woven member 1 and the woven member 1 comprises extension sections 12, 13 to allow the extension sections 12, 13 of the wirelessly connectable light source of the present invention to be directly mounted to an article through sewing, welding, adhesively bonding, or weaving, so that the drawbacks of the conventionally known techniques can be completely overcome. With the arrangement of the extension sections 12, 13, an article can be manufactured with the original way that is adopted to make the article without modification of the manufacturing process for mounting the light source the article together, so that the original form of the article can be preserved and light illumination can be added. Further, the woven member 1 is provided with a receiver circuit 8, which is provided for receiving an AC signal transmitted from a transmitter circuit 91 of a charging device 9 so that the receiver circuit 8 converts the received AC signal into electrical power to be stored in a rechargeable battery 84 of the receiver circuit 8. Afterwards, the receiver circuit 8 may supply electrical power to the light-emitting elements 2 for energization and emission of light, and the light-emitting elements 2 can be controlled by the switch 61 for lighting on or off. The control circuit 6 provides a control over the lighting fashion of the light-emitting elements 2. The external connecting member 7 provides a selection for use or no use of the control circuit 6 and the receiver circuit 8. The extension sections 12, 13 can be provided with insulation by being soaking in a liquid or solution of insulation material. Further, the rechargeable battery 84 of the receiver circuit 8 may be a sheet like flexible battery, which was recently developed, to get better fit to applications in articles to be worn on a human body. Further, the light-emitting elements can be woven with the woven member in weaving the woven member so that it only needs to make a trim to fit a practical application and connection with switch, receiver circuit; and control circuit can be performed to thereby make the device completely fit to a desired specification and requirement. Alternatively, an existing fabric or woven band can be used to enclose the light-emitting element and then one or more holes can be formed through for example punching or fusion to allow outward projection of light emitting from the light-emitting element.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wirelessly connectable light source, which is adapted to be used in an article, a charging device being coupled to the article, the charging device comprising a transmitter circuit and a power source connected to the transmitter circuit, the power source supplying electrical power to the transmitter circuit, the electrical power being converted by the transmitter circuit into an alternate-current signal, the wirelessly connectable light source comprising:

a woven member, which comprises a body and at least one extension section extending from the body;
   an electrical conductor, which is arranged in the body;
   a receiver circuit, which comprises a rechargeable battery and is electrically connected to the conductor, the transmitter circuit transmitting the alternate-current signal to the receiver circuit, the receiver circuit receiving and converting the alternate-current signal to electrical power, which is stored in the rechargeable battery; and
   at least one light-emitting element, which is arranged in the body, the light-emitting element comprising a light emission section and at least two conductive sections, the light emission section emitting light projecting out of the body, the two conductive sections being in electrical connection with the conductor;
   wherein the wirelessly connectable light source is integrated with the article through the extension section of the woven member thereof.

2. The wirelessly connectable light source as claimed in claim 1, wherein the body forms at least one hole, light emitting from the light emission section of the light-emitting element being projected outside the body through the hole.

3. The wirelessly connectable light source as claimed in claim 2 comprising a plurality of light-emitting elements and wherein the body of the woven member forms a plurality of holes corresponding to the plurality of light-emitting elements so that light emitting from the light emission section of each of the light-emitting element is projected outside the body through the respective hole.

4. The wirelessly connectable light source as claimed in claim 1, wherein the extension section is mounted to the article through one of sewing, welding, adhesively bonding, and weaving.

5. The wirelessly connectable light source as claimed in claim 1, wherein conductor comprises a flexible printed circuit board and the two conductive sections of the light-emitting element comprise two conductive pins that are electrically connected to the flexible printed circuit board.

6. The wirelessly connectable light source as claimed in claim 1, wherein the conductor comprises at least two conductive wires and the two conductive sections of the light-emitting element are respectively in electrical connection with the two conductive wires.

7. The wirelessly connectable light source as claimed in claim 6, wherein the two conductive wires are woven with the body of the woven member.

8. The wirelessly connectable light source as claimed in claim 7, wherein the two conductive wires are arranged to intersect each other at intervals and woven with the body, the intersections of the two conductive wires being spaced by portions of the body.

9. The wirelessly connectable light source as claimed in claim 1 further comprising a control circuit and a switch, wherein the control circuit, the switch, and the receiver circuit are electrically connected to the conductor, the control circuit controlling lighting fashion of the light-emitting element.

10. The wirelessly connectable light source as claimed in claim 1 further comprising an external connecting member, a connector, and a switch, wherein the connector and the switch are electrically connected to the conductor, the external connecting member comprising the receiver circuit and a control circuit that controls lighting fashion of the light-emitting element, the external connecting member further comprising a counterpart connector corresponding to the connector, the external connecting member being electrically connectable through mating engagement between the counterpart connector and the connector.

11. The wirelessly connectable light source as claimed in claim 1, wherein the woven member comprises two extension sections extending from the body, the extension sections of the woven member being mounted to the article.

12. The wirelessly connectable light source as claimed in claim 11, wherein the conductor comprises at least two conductive wires and the two conductive sections of the light-emitting element are respectively in electrical connection with the two conductive wires.

13. The wirelessly connectable light source as claimed in claim 12, wherein the two conductive wires are woven with the body of the woven member.

14. The wirelessly connectable light source as claimed in claim 13, wherein the two conductive wires are arranged to intersect each other at intervals and woven with the body, the intersections of the two conductive wires being spaced by portions of the body.

15. The wirelessly connectable light source as claimed in claim 11 further comprising a control circuit and a switch, wherein the control circuit, the switch, and the receiver circuit are electrically connected to the conductor, the control circuit controlling lighting fashion of the light-emitting element.

16. The wirelessly connectable light source as claimed in claim 11 further comprising an external connecting member, a connector, and a switch, wherein the connector and the switch are electrically connected to the conductor, the external connecting member comprising the receiver circuit and a control circuit that controls lighting fashion of the light-emitting element, the external connecting member further comprising a counterpart connector corresponding to the connector, the external connecting member being electrically connectable through mating engagement between the counterpart connector and the connector.

17. The wirelessly connectable light source as claimed in claim 1, wherein the body of the woven member comprises two mutually-connectable half portions, the extension section extending from a first one of the two half portions, a second one of the two half portions forming a coupling rim, which is coupled to the extension section through one of sewing and bonding.

18. The wirelessly connectable light source as claimed in claim 1, wherein the light-emitting element comprises one of a light-emitting diode and an organic light-emitting diode.

19. The wirelessly connectable light source as claimed in claim 1, wherein the transmitter circuit comprises an oscillation and frequency-division circuit, a driving and amplifying circuit, a primary transmitting resonant circuit, and a transmitter coil, the oscillation and frequency-division circuit being connected to the power source, the oscillation and frequency-division circuit converting the electrical power supplied from the power source into an alternate-current signal, the driving and amplifying circuit being connected to the oscillation and frequency-division circuit, the driving and amplifying circuit amplifying the alternate-current signal that is formed by the oscillation and frequency-division circuit, the primary transmitting resonant circuit being connected to the driving and amplifying circuit, the primary transmitting resonant circuit providing resonance to the amplified alternate-current signal, the transmitter coil being connected to the primary transmitting resonant circuit transmitting the alternate-current signal that is subjected to resonance by the primary transmitting resonant circuit to the receiver circuit.

20. The wirelessly connectable light source as claimed in claim 19, wherein the transmitter circuit further comprises a feedback detection circuit and a control regulation circuit, the feedback detection circuit being connected to the transmitter coil, the control regulation circuit being connected to the feedback detection circuit and the oscillation and frequency-division circuit, whereby the feedback detection circuit feeds the alternate-current signal transmitted by the transmitter coil back to the control regulation circuit to allow the control regulation circuit to regulate oscillation frequency of the oscillation and frequency-division circuit.

21. The wirelessly connectable light source as claimed in claim 1, wherein the receiver circuit comprises a receiver induction coil, a secondary receiving resonant circuit, and an AC/DC rectification and filtering regulation circuit, the receiver induction coil receiving an alternate-current signal transmitted from the transmitter circuit, the secondary receiving resonant circuit being connected to the receiver induction coil, the secondary receiving resonant circuit providing resonance to the alternate-current signal received by the receiver induction coil, the AC/DC rectification and filtering regulation circuit being connected to the secondary receiving resonant circuit, the AC/DC rectification and filtering regulation circuit performing rectification and regulation of the alternate-current signal that is subjected to resonance by the secondary receiving resonant circuit so as to convert the alternate-current signal into electrical power, the AC/DC rectification and filtering regulation circuit being connected to the rechargeable battery so as to store the electrical power obtained by the performance of the AC/DC rectification and filtering regulation circuit to the rechargeable battery.

22. The wirelessly connectable light source as claimed in claim 1 further comprising a waterproof layer formed on the light emission section of the light-emitting element.

23. The wirelessly connectable light source as claimed in claim 1, wherein the coupling between the charging device and the article is realized through one of clamping, bonding, adhering, and mutual attraction.

24. A wirelessly connectable light source, which is adapted to be used in an article, a charging device being coupled to the article, the charging device comprising a transmitter circuit and a power source connected to the transmitter circuit, the power source supplying electrical power to the transmitter circuit, the electrical power being converted by the transmitter circuit into an alternate-current signal, the wirelessly connectable light source comprising:
 a woven member, which comprises a body and at least one extension section extending from the body;
 a flexible printed circuit board, which is mounted to the body of the woven member through adhesively bonding;
 a receiver circuit, which comprises a rechargeable battery and is electrically connected to the flexible printed circuit board, the transmitter circuit transmitting the alternate-current signal to the receiver circuit, the receiver circuit receiving and converting the alternate-current signal to electrical power, which is stored in the rechargeable battery; and
 at least one light-emitting element, which comprises a light emission section and at least two conductive sections, the two conductive sections being in electrical connection with the flexible printed circuit board;
 wherein the wirelessly connectable light source is integrated with the article through the extension section of the woven member thereof.

25. The wirelessly connectable light source as claimed in claim 24, wherein the two conductive sections of the light-emitting element comprise two conductive pins that are electrically connected to the flexible printed circuit board.

26. The wirelessly connectable light source as claimed in claim 24 further comprising a cover and wherein the light-emitting element is enclosed between the cover and the flexible printed circuit board.

27. The wirelessly connectable light source as claimed in claim 24 further comprising a control circuit and a switch, wherein the control circuit, the switch, and the receiver circuit are electrically connected to the flexible printed circuit board, the control circuit controlling lighting fashion of the light-emitting element.

28. The wirelessly connectable light source as claimed in claim 24 further comprising an external connecting member, a connector, and a switch, wherein the connector and the switch are electrically connected to the flexible printed circuit board, the external connecting member comprising the receiver circuit and a control circuit that controls lighting fashion of the light-emitting element, the external connecting member further comprising a counterpart connector corresponding to the connector, the external connecting member being electrically connectable through mating engagement between the counterpart connector and the connector.

29. The wirelessly connectable light source as claimed in claim 24, wherein the transmitter circuit comprises an oscillation and frequency-division circuit, a driving and amplifying circuit, a primary transmitting resonant circuit, and a transmitter coil, the oscillation and frequency-division circuit being connected to the power source, the oscillation and frequency-division circuit converting the electrical power supplied from the power source into an alternate-current signal, the driving and amplifying circuit being connected to the oscillation and frequency-division circuit, the driving and amplifying circuit amplifying the alternate-current signal that is formed by the oscillation and frequency-division circuit, the primary transmitting resonant circuit being connected to the driving and amplifying circuit, the primary transmitting resonant circuit providing resonance to the amplified alternate-current signal, the transmitter coil being connected to the primary transmitting resonant circuit transmitting the alternate-current signal that is subjected to resonance by the primary transmitting resonant circuit to the receiver circuit.

30. The wirelessly connectable light source as claimed in claim 29, wherein the transmitter circuit further comprises a feedback detection circuit and a control regulation circuit, the feedback detection circuit being connected to the transmitter coil, the control regulation circuit being connected to the feedback detection circuit and the oscillation and frequency-division circuit, whereby the feedback detection circuit feeds the alternate-current signal transmitted by the transmitter coil back to the control regulation circuit to allow the control regulation circuit to regulate oscillation frequency of the oscillation and frequency-division circuit.

31. The wirelessly connectable light source as claimed in claim 24, wherein the receiver circuit comprises a receiver induction coil, a secondary receiving resonant circuit, and an AC/DC rectification and filtering regulation circuit, the receiver induction coil receiving an alternate-current signal transmitted from the transmitter circuit, the secondary receiving resonant circuit being connected to the receiver induction coil, the secondary receiving resonant circuit providing resonance to the alternate-current signal received by the receiver induction coil, the AC/DC rectification and filtering regulation circuit being connected to the secondary receiving resonant circuit, the AC/DC rectification and filtering regulation circuit performing rectification and regulation of the alternate-current signal that is subjected to resonance by the secondary receiving resonant circuit so as to convert the alternate-current signal into electrical power, the rechargeable battery storing the electrical power obtained by the performance of the AC/DC rectification and filtering regulation circuit.

32. The wirelessly connectable light source as claimed in claim 24, wherein the coupling between the charging device and the article is realized through one of clamping, bonding, adhering, and mutual attraction.

\* \* \* \* \*